(12) United States Patent
Gushima et al.

(10) Patent No.: US 7,113,473 B2
(45) Date of Patent: ***Sep. 26, 2006

(54) OPTICAL INFORMATION RECORDING APPARATUS FOR STABLE RECORDING

(75) Inventors: Toyoji Gushima, Habikino (JP); Makoto Usui, Osaka (JP); Kenji Koishi, Sanda (JP); Yuuichi Kamioka, Kantano-hi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/046,777

(22) Filed: Feb. 1, 2005

(65) Prior Publication Data

US 2005/0152260 A1    Jul. 14, 2005

Related U.S. Application Data

(62) Division of application No. 09/832,938, filed on Apr. 12, 2001, now Pat. No. 6,868,053.

(30) Foreign Application Priority Data

Apr. 12, 2000   (JP)   ............................ P2000-110258

(51) Int. Cl.
    *G11B 7/00* (2006.01)
(52) U.S. Cl. .................. 369/116; 369/47.51; 369/59.11; 369/124.05; 369/124.12
(58) Field of Classification Search ................ 369/116, 369/121, 122, 59.1, 59.24, 59.11, 124.05, 369/124.12, 47.51
    See application file for complete search history.

(56) References Cited

U.S. PATENT DOCUMENTS

| | | | |
|---|---|---|---|
| 5,109,373 A | 4/1992 | Ohno et al. | |
| 5,150,351 A | 9/1992 | Ohno et al. | |
| 5,930,222 A | 7/1999 | Yoshida et al. | |
| 6,014,348 A | 1/2000 | Kim | |
| 6,731,586 B1 | 5/2004 | Seo et al. | |

FOREIGN PATENT DOCUMENTS

| | | |
|---|---|---|
| EP | 933 759 A2 | 8/1999 |
| JP | 3-185628 | 8/1991 |
| JP | 5-144000 | 6/1993 |
| JP | 7-320282 | 12/1995 |
| JP | 10-40548 | 2/1998 |
| JP | 10-283638 | 10/1998 |
| JP | 11-66594 | 3/1999 |
| JP | 11-213429 | 8/1999 |
| JP | 2000113454 | 4/2000 |

*Primary Examiner*—Nabil Hindi
(74) *Attorney, Agent, or Firm*—Wenderoth, Lind & Ponack, L.L.P.

(57) ABSTRACT

In an apparatus for recording information to an optical recording medium, a laser beam is irradiated to and reflected from the medium. A photodetector detects the light quantity of the irradiated or reflected light beam, and the detected laser beam is subjected to signal processing. Then, a sampler samples the laser beam at the timing of a sampling pulse which is supplied from a sampling pulse generator. Then, a controller controls the laser power according to the sampled laser beam. A pulse timing setting unit sets and adjusts the timing of the sampling pulse by taking into account the response time in the propagation path of the laser beam from the start of the irradiation to the sampling. Thus, the laser power can be monitored correctly, and the laser power can be optimized so as to stably and reliably reproduce an address signal and to generate a servo signal while data is being recorded.

15 Claims, 12 Drawing Sheets

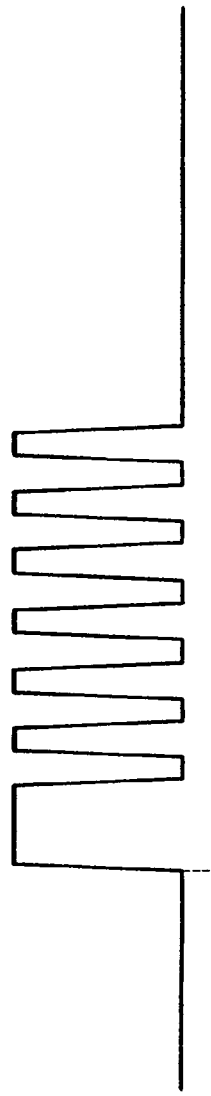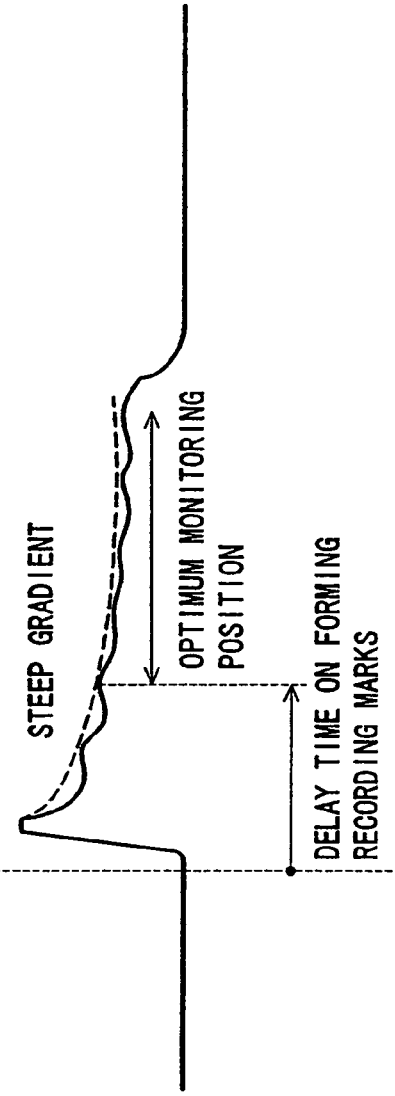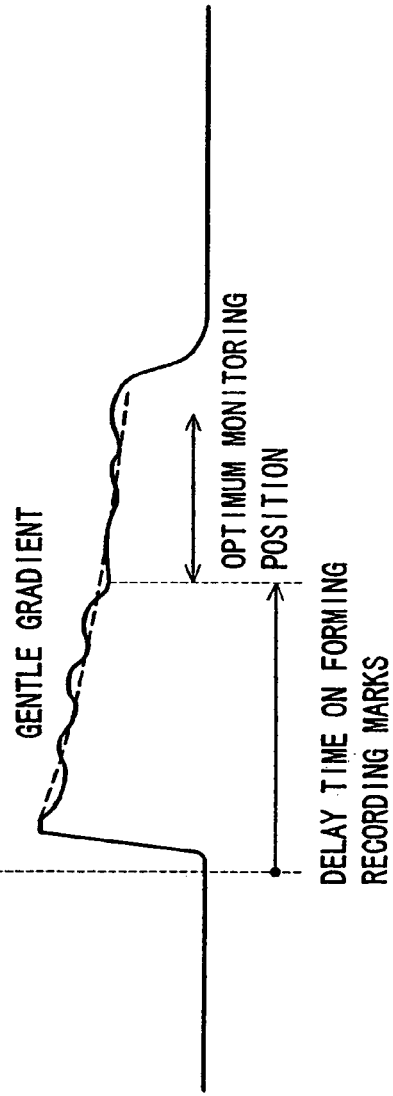

OPTICAL INFORMATION RECORDING APPARATUS FOR STABLE RECORDING

This is a divisional application of U.S. application Ser. No. 09/832,938, filed on Apr. 12, 2001 now U.S. Pat. No. 6,868,053.

BACKGROUND OF THE INVENTION

1. Field of the Invention

The present invention relates to an apparatus and a method for recording information on a recording medium such as an optical disk by applying a laser beam to an optical recording medium.

2. Description of Prior Art

An optical information recording medium such as an optical disk has been recently developed and marketed as an external memory of a computer and a medium for recording images and sounds. Optical disks that are already being practically used and on which data can be recorded include organic-dye-based, phase-change-type, and magneto-optic disks in which data is recorded by applying a laser beam to a recording film.

Pulse width modulation (hereinafter referred to as PWM) is known for recording data on an optical disk at a high density. The PWM technology performs modulation so that edges at the leading and trailing ends of record marks correspond to one of a digital signal. Such a technique is favorable in order to record data at a high density because more bits can be assigned in a record mark of the same length than the pulse position modulation technology for performing modulation so that the position of a record mark corresponds to one of a digital signal.

In the PWM technique, it is necessary to form a record mark without distortion; that is, it is necessary form the leading and trailing ends of the record mark in the same quality because the width of a record mark has information. Especially, when a long mark is formed in a phase-change-type optical disk, the width in the radial direction of a record mark increases toward the latter-half portion of the record mark due to the thermal storage effect of a recording film; that is, the record mark is distorted like a tear drop. In order to solve this problem, a recording method has been proposed for forming one record mark by applying a plurality of short pulse strings (e.g. Japanese patent laid-open Publication No. 185628/1991).

A general optical disk has a spiral track or concentric information tracks on the disk surface, and it records or reproduces information by applying a laser beam along the information track. In order to manage recording data easily, the information track is divided into sectors and addresses are given to the sectors.

The data format of an optical disk on which data can be recorded can be roughly classified into two types. One of the types has a sector format in which address sections and data sections are separated from each other. Magneto-optic disk and DVD-RAM standardized by ISO/IEC 10089 and the like belong to this type. Because the address sections are completely separated, address reproduction and data recording can be performed by time sharing without interfering each other even upon recording. Moreover, a buffer area, which is referred to as a gap area, is generally provided at a boundary between a address section and a data section. Therefore, by using the gap area, a recording apparatus can perform laser power control in any sector even when data is currently being recorded.

The other type has a sector format in which address sections and data sections are not separated from each other. CD-R, CR-RW, DVD-R, DVD-RW and the like belong to this type. Because there is no separated address section, it is possible to continuously record data, and it is possible to increase the recording density (format efficiency). However, it is necessary to reproduce addresses while recording data. Thus, it is necessary to control laser power under data recording.

A recording apparatus for CD-R controls optimizing a recording laser power with a process which is referred to as optimum power control (OPC) when information is recorded. OPC is performed by recording and reproducing predetermined data in a power calibration area (hereafter referred to as PCA) on an optical disk. For example, a test recording is performed to the PCA by changing the laser power in the unit of a sync frame and by reproducing the area to which the test recording is performed. Then, the laser power with which the best recording state is obtained is selected, and the selected laser power is used as the recording power for recording user data (refer to Orange Book of optical-disk recordable standards).

Moreover, there is another method which is referred to as running optimum power control (R-OPC) for controlling the recording power in accordance with the quantity of light that is reflected from an optical disk when user data is recorded. In R-OPC, the light quantity that is obtained by forming recording marks to record user data in the above-mentioned OPC is compared with the light quality that is obtained in the OPC, and the laser power is corrected in real time in accordance with the comparison result. As a mark part for obtaining the light quantity, an 11T mark is used (e.g. Japanese Patent laid open Publication No. 40548/1998). An 11T mark has a mark length which is equivalent to the longest mark length of a Eight-to-Fourteen-Modulation (EFM) code which is used for the CD standards, and the synchronization code of a sync frame has a 11T mark and a 11T space. Therefore, it has a mark length which appears at least once in a sync frame.

As mentioned above, in the continuous recording format such as CD-R/RW or DVD-R/RW, the light quantity of light that is reflected from a disk is changed according to the modulation of a laser beam upon data recording. Therefore, it is difficult to stably reproduce an address signal. Moreover, because there is not a period for controlling the laser power while recording user data, it is necessary to control the laser power in accordance with the light quantity of light which is emitted by a laser or the light quantity of light which is reflected from a disk while recording data. For example, in order to sample-and-hold a high power part of a laser beam during recording, it is necessary to generate a sampling pulse corresponding to the timing of the record pulse signal for modulating the laser.

However, in correspondence to recent applications of consumer appliances from audio recording to image recording, or in order to meet recent demands for the high speed operation speeds of peripheral units of a computer, the recording rate of an optical disk recording apparatus becomes higher. As the recording rate is increased, it becomes impossible to ignore influences on the stable sampling of a detection signal of transmission characteristics (propagation delay and settling) in a detection system for detecting the light quantity of an emitted laser beam or of a reflected light, fluctuations in power-supply voltage and temperature of the system and the like.

This is because when the recording rate is enhanced, the absolute time for the same mark length is shortened and, as a result, it is not easy to secure the time that is required to surely sample-and-hold the laser power. Moreover, the time axis of a monitoring signal for the light quantity of a emitted laser beam or a reflected laser beam to be sampled-and-held depends on the transmission characteristics (propagation delay and settling) in a detection system or the fluctuations in the power-supply voltage and temperature of the system. Therefore, a problem occurs in that the time margin for stable sampling-and-holding runs becomes short.

Moreover, as mentioned above, in the case of CD-R/RW, 11T, which is the longest mark length, appears at least once in a sync frame. The sync code of DVD-R/RW includes 14T only once, and 14T becomes a mark or a space depending on the series of modulated data just before the 14T mark. Therefore, a 14T mark does not always appear once in a sync mark. Further, the longest mark length of a 8–16 modulation code that is used for DVD-R/RW is equal to 11T, similar to the case of the EFM modulation code. However, the appearance probability of the 8–16 modulation code is very low, and it is not assured that the code appears at equal intervals. Therefore, particularly in the case of DVD-R/RW, there are problems in that the DVD-R/RW has a recording rate which is higher than the recording rate of CD-R/RW, and that it is difficult to obtain a mark length (or space length) which is capable of stably performing sampling-and-holding at a necessary time interval.

SUMMARY OF THE INVENTION

An object of the present invention is to provide an apparatus and a method which can set an optimum laser power while data are being recorded to an optical disk or the like.

Another object of the present invention is to provide an apparatus and a method which can reproduce address signals and servo signals stably and reliably while data are being recorded to an optical disk or the like.

In one aspect of the present invention, an optical information recording and reproducing apparatus is provided which records information by emitting a laser beam that is modulated according to recording data to a recording medium. The apparatus comprises a laser light source which emits a laser beam to a recording medium, a recording pulse generator which generates recording pulse signals so as to modulate an optical intensity of the laser light source according to recording data, a laser driver which drives the laser light source according to the generated recording pulse signals, a photodetector which detects the laser beam that is emitted by the laser light source, a sampler which samples an output signal of the photodetector, and a sampling timing generator which generates a sampling timing to instruct sampling to the sampler. The sampling timing generator generates a sampling timing which is delayed by at least a response time of a propagation path including the laser driver, the laser light source and the photodetector. Preferably, the sampling timing generator generates a sampling timing for a record mark (such as a space portion) having a length which is longer than a sum of a settling time of a signal propagating the propagation path and a necessary acquisition time and a necessary aperture time of said sampler.

Similarly, in a different optical information recording and reproducing apparatus, a photodetector detects the laser beam that is emitted by the laser light source and reflected by a recording medium. The sampling timing generator generates a sampling timing which is delayed by at least a response time of a propagation path including the laser driver, the laser light source and the photodetector.

In another aspect of the invention, an optical information recording and reproducing apparatus is provided which records information by emitting a laser beam that is modulated according to recording data to a recording medium having pits which are formed as address information for managing a data position. The apparatus comprises a laser light source which emits a laser beam to a track in a recording medium for recording data, a recording pulse generator which generates recording pulse signals so as to modulate an optical intensity of the laser light source according to the recording data on recording, a laser driver which drives the laser light source according to the generated recording pulse signals, a photodetector which detects the laser beam that is emitted by the laser light source and reflected by the recording medium, a first binarizer which binarizes an output signal of the photodetector with a first slicing level, a second binarizer which binarizes an output signal of the photodetector with a second slicing level, a selector which selects one of a first output signal of the first binarizer and a second output signal of the second binarizer, a selection signal generator which generates a selection signal to instruct the selector which of the first and second output signals to select, and a reproducer which reproduces address information by using an output signal of the selector. The selection signal generator generates a timing of the selection signal according to a response time of a propagation path including the laser driver, the laser light source, the photodetector, and the first and second binarizers. Preferably, the sampling timing generator generates a sampling timing for a record mark (such as a space portion) having a length which is longer than a sum of a settling time of a signal propagating the propagation path and a necessary acquisition time and a necessary aperture time of the sampler. Preferably, the sampling timing generator changes a sampling timing according to a type of the recording medium.

In a further aspect of the invention, in a method of recording optical information by emitting a laser beam by a laser light source to a recording medium, the laser beam has its intensity modulated according to recording data. The method comprises the steps of applying a recording pulse to the laser light source so as to emit a pulse light beam according to the recording pulse, detecting the light quantity of the emitted pulse light beam, and sample-and-holding the detected light quantity according to a sampling pulse so as to detect the optical intensity of the laser beam. The timing of the sampling pulse is delayed by at least a response time of a recording pulse in a propagation path from application of the recording pulse until just before sample-and-holding it, and the timing is generated for a recording mark having a length which is longer than a sum of a necessary acquisition time and a necessary aperture time for sampling.

Similarly, in a different optical information recording and reproducing method, the laser beam that is emitted by the laser light source and reflected by a recording medium is detected. Then, a sampling timing is delayed by at least a response time of a propagation path including the laser driver, the laser light source and the photodetector.

An advantage of the present invention is that the sampling timing for detecting a laser beam can always be optimized.

Another advantage of the present invention is that reliability of the apparatus and the method of recording optical information can be improved greatly.

BRIEF DESCRIPTION OF THE DRAWINGS

These and other objects and features of the present invention will become clear from the following description when taken in conjunction with the preferred embodiments thereof with reference to the accompanying drawings, in which:

FIGS. 10A, 10B and 10C are diagrams illustrating the relationship between sensitivity, the light quantity of a reflection light, and an optimum monitoring position of the light quantity of a recording film of a recording medium, wherein FIG. 10A is a graph of recording a multi-pulse, and FIGS. 10B and 10C are graphs of the light quantity of reflection light for a high sensitivity recording film and for a low sensitivity recording film;

DETAILED DESCRIPTION OF THE INVENTION

First Embodiment

Figure 1:
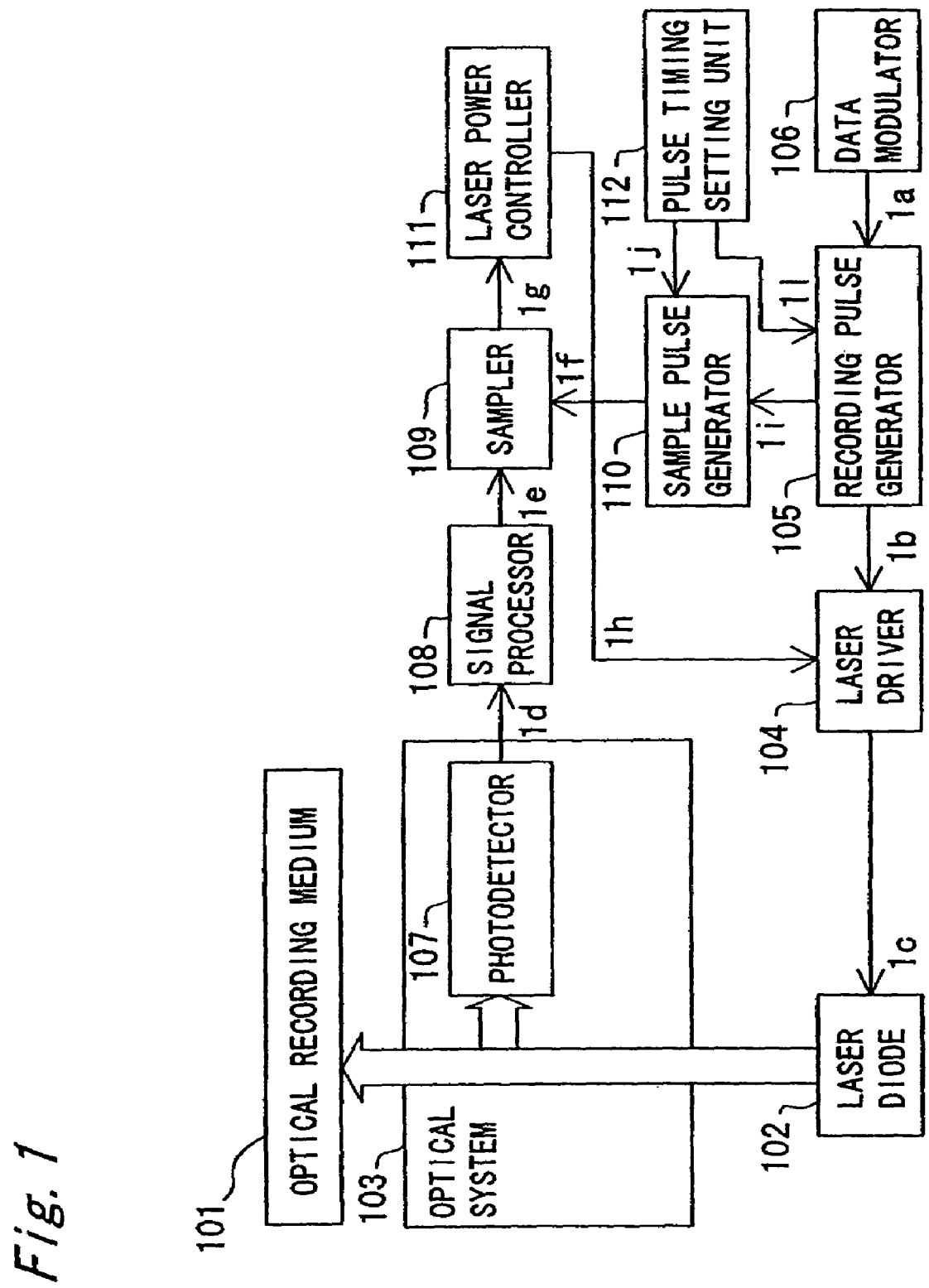
FIG. 1 is a block diagram of the configuration of the optical information recording apparatus according to a first embodiment of the present invention.

With reference to the drawings, wherein like reference characters designate like or corresponding parts throughout the several views, FIG. 1 shows a configuration of an optical information recording apparatus of a first embodiment of the present invention. In FIG. 1, for recording or reproducing data, a laser beam which is emitted from a laser diode 102 is converged by an optical system 103 so as to irradiate a beam spot onto the recording face of an optical recording medium 101.

When data is recorded, a data modulator 106 adds error correction redundant bits to user data which are to be recorded as needed, and outputs data 1a that is modulated to a code series so as to be recorded on the optical recording medium 101. For example, DVD-R uses an 8–16 modulation code as a recording code series, and mark lengths and space lengths to be formed are restricted to 3T to 11T and 14T, wherein 1T denotes a recording channel clock period. Therefore, by relating a high level of the modulated data 1a to a mark of a recording signal and a low level of the modulated data 1a to a space of the recording signal, the modulated data 1a becomes a digital signal whose high and low levels are restricted to the widths of 3T to 11T and 14T.

A recording pulse generator 105 generates a recording pulse signal 1b which is obtained by processing the timing of the modulated data 1a that is sent from the data modulator 106 as needed, and outputs the recording pulse signal 1b to a laser driver 104. The waveform of the recording pulse signal 1b is based on the multi-pulse recording waveform mentioned above in order to avoid, for example, a recording mark from becoming a tear drop shape due to the thermal storage in a recording film. Moreover, the recording pulse generator 105 outputs a sampling pulse reference timing 1i which serves as the criterion of a sampling pulse output signal to a sampling pulse generator 110, as will be described later.

The laser driver 104 supplies a laser driving current 1c so that the laser diode 102 emits a light beam with the recording power in accordance with the timing of the recording pulse signal 1b. Further, the laser driver 104 generates the laser driving current 1c so that the laser diode 102 emits a light beam with the reproducing power for reproducing data.

A photodetector (or photoelectric converter) 107 converts light intensity to an electrical signal, and the photodetector 107 is mounted in the optical system 103. That is, the photodetector 107 detects the light which is emitted from the laser diode 102 and converts the emitted light to a current having an amplitude that corresponds to the intensity of the emitted light.

The output current 1d of the photodetector 107 is sent to a signal processor 108. In the signal processor 108, at least an I/V conversion for converting a current to a voltage signal is performed. Thereafter, a gain conversion is performed for changing the voltage amplitudes as needed, and filtering is also performed for extracting only a specified frequency component. Then, a monitoring voltage signal 1e which is subjected to the above-described signal processing is outputted to a sampler 109.

The sampler 109 samples-and-holds the monitoring-voltage signal 1e that is sent by the signal processor 108 at the timing of a sampling pulse 1f that is sent from the sampling pulse generator 110. A signal 1g that is sampled-and-held by the sampler 109 is supplied to a laser power controller 111.

The laser power controller 111 sets a recording power 1h of the laser driver 104 for the emitted light in accordance with the signal 1g that is sampled-and-held by the sampler 109 after propagating the laser diode 102, the photodetector 107, the signal processor 108 and the sampler 109. For example, the laser power controller 111 adjusts the setting value 1h of recording-power so that the recording power for forming a recording mark on the optical recording medium 101 has an amplitude level which is predetermined by the sampling-and-holding output signal 1g.

A pulse timing setting unit 112 sets a setting value 1j of a sampling pulse for the sampling pulse generator 110 and a setting value 1l of the recording pulse for the recording pulse generator 105.

Figure 2:
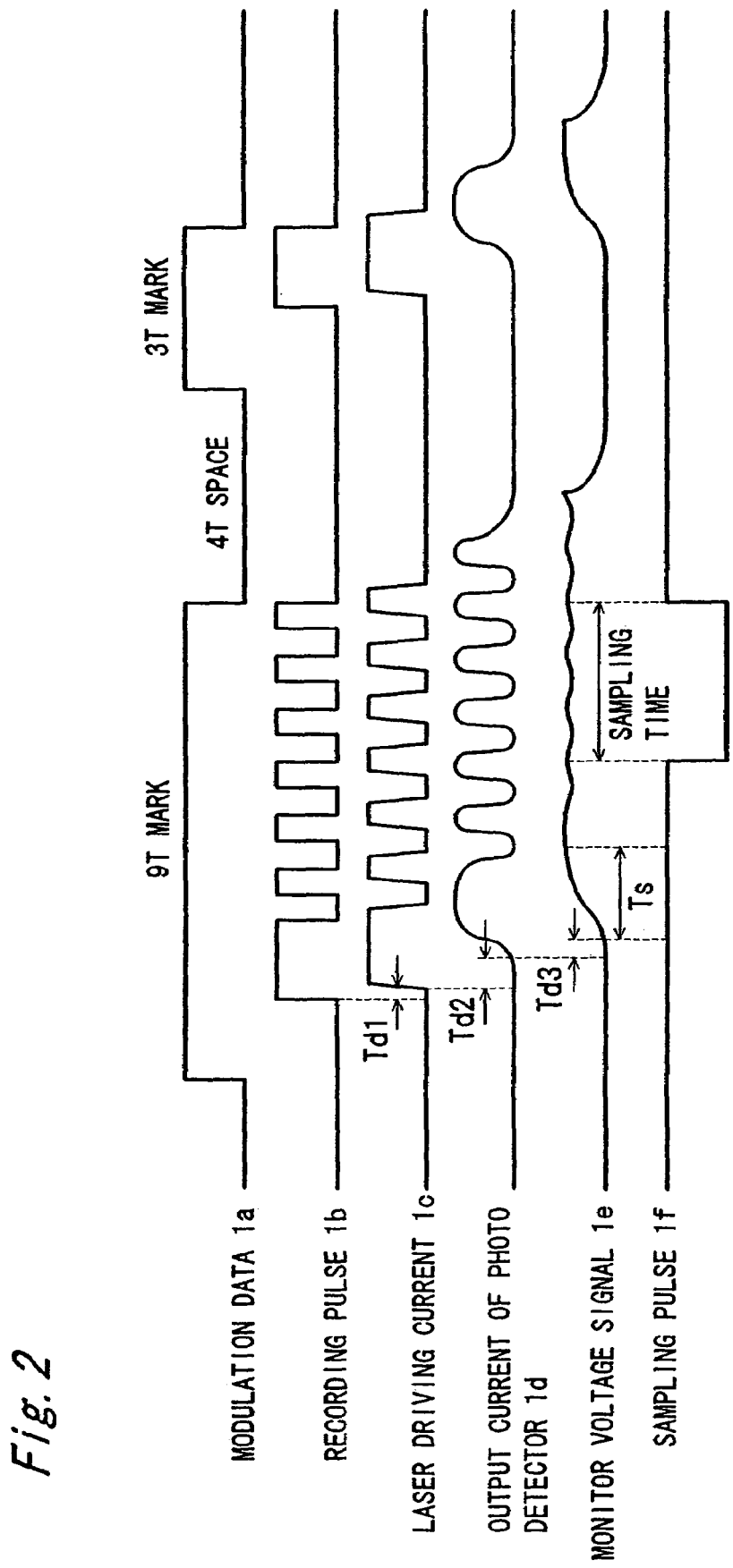
FIG. 2 is a timing chart for explaining internal operations of the optical information recording apparatus.

FIG. 2 is a timing chart of timings in the constitute elements which are shown in FIG. 1. The example of FIG. 2 shows recording waveforms for 9T mark, 4T space, and 3T mark.

As shown in FIG. 2, the recording pulse signal 1b has a multi-pulse waveform for the modulated data 1a. The laser-driving current 1c is generated by being delayed by Td1 from the recording pulse signal 1b. In this case, Td1 is assumed to be the circuit propagation delay time of the laser driver 104.

The laser diode 102 emits light in accordance with the laser driving current 1c, and the output current 1d of the photodetector 107 for detecting the emitted light is obtained as shown in FIG. 2. The propagation time from the laser emission to the output of the photoelectric conversion of the emitted light is represented as Td2.

The monitoring voltage signal 1e after being subjected to I/V conversion, gain conversion, and filtering by the signal processor 108 has a waveform as shown in FIG. 2. The delay time due to this signal processing is represented as Td3.

The sampler 109 samples-and-holds the monitoring voltage signal 1e that is received from the signal processor 108 at the timing of the sampling pulse 1f (or the sampler 109 samples the signal 1e in the low level period in FIG. 2). However, in order to accurately monitor the recording power for forming a recording mark, it is necessary to sample the monitoring voltage signal 1e surely while the recording power is emitted.

The timing of the sampling pulse 1f depends on the following factors:
(1) propagation delay time;
(2) settling time; and
(3) data recording frequency.

In the optical information recording apparatus of this first embodiment, the propagation delay time in the above factor (1) shows a sum of delay times in the propagation path of the emitted laser beam during recording, where the propagation path consists of the laser driver 104, the laser diode 102, the photodetection 107, and the signal processor 108. The sum amounts to Td1 +Td2+Td3.

The propagation delay time represents a period from the start time when the recording pulse generator 105 outputs the leading end of the first wave in the recording pulse 1b to the end time when a rising waveform corresponding to the first wave in the recording pulse 1b appears in the monitoring voltage signal 1e that is received from the signal processor 108. Therefore, in order to sample-and-hold the amplitude of a portion corresponding to the recording power, it is necessary to begin to output a sampling pulse after delaying the recording pulse at least by the time corresponding to the propagation delay time (Td1 +Td2+ Td3).

The settling time in the above factor (2) can be paraphrased as the time until waveform deterioration which is caused by the components such as the laser driver in the propagation path converges. This depends on the frequency characteristics of the components. When the sampling start timing is decided only by the propagation delay time, a deteriorated waveform is sampled so that it is impossible to detect an accurate power value. Therefore, it is preferable to delay a recording pulse by the time that is obtained by a sum of the settling time and the propagation delay time and to start to output the sampling pulse thereafter. In order to estimate the settling time, for example, it is preferable to calculate an average of a root of a sum of squares of the settling times for the components.

The data recording frequency in the above factor (3) relates to the time length of a recording mark. If the time that is obtained by subtracting the settling time from the application time of the recording power of each recording mark is shorter than the sum of the acquisition time and the aperture time of the sampler 109, it is impossible to detect an accurate power value. Therefore, a recording mark length to which a sampling pulse should be output must be at least longer than the sum of the settling time of the propagation path and the necessary acquisition time and the necessary aperture time of the sampler 109.

In sum, it is preferable (a) to make the sampling pulse start timing delayed at least by the sum of the propagation delay time and the settling time of the propagation path from the leading end of the first waveform of a recording pulse, (b) to make the width of a sampling pulse larger than the necessary acquisition time of the sampler 109, and (c) to make a recording mark length at least longer than the sum of the settling time of the propagation path and the necessary acquisition time and the necessary aperture time of the sampler 109.

The sampling pulse start timing tx and the shortest recording mark length n to which a sampling pulse should be output can be shown by the following formulae:

$$tx > Td + Ts; \text{ and} \quad (1)$$

$$n > (Ts + Tw + Ta) * f, \quad (2)$$

wherein Td denotes a propagation delay time of the propagation path, Ts denotes a settling time of the path, f (=1/T) denotes the recording frequency of the path, Tw denotes the sampling pulse width of the path, and Ta denotes the aperture time of the sampler 109.

Figure 4:
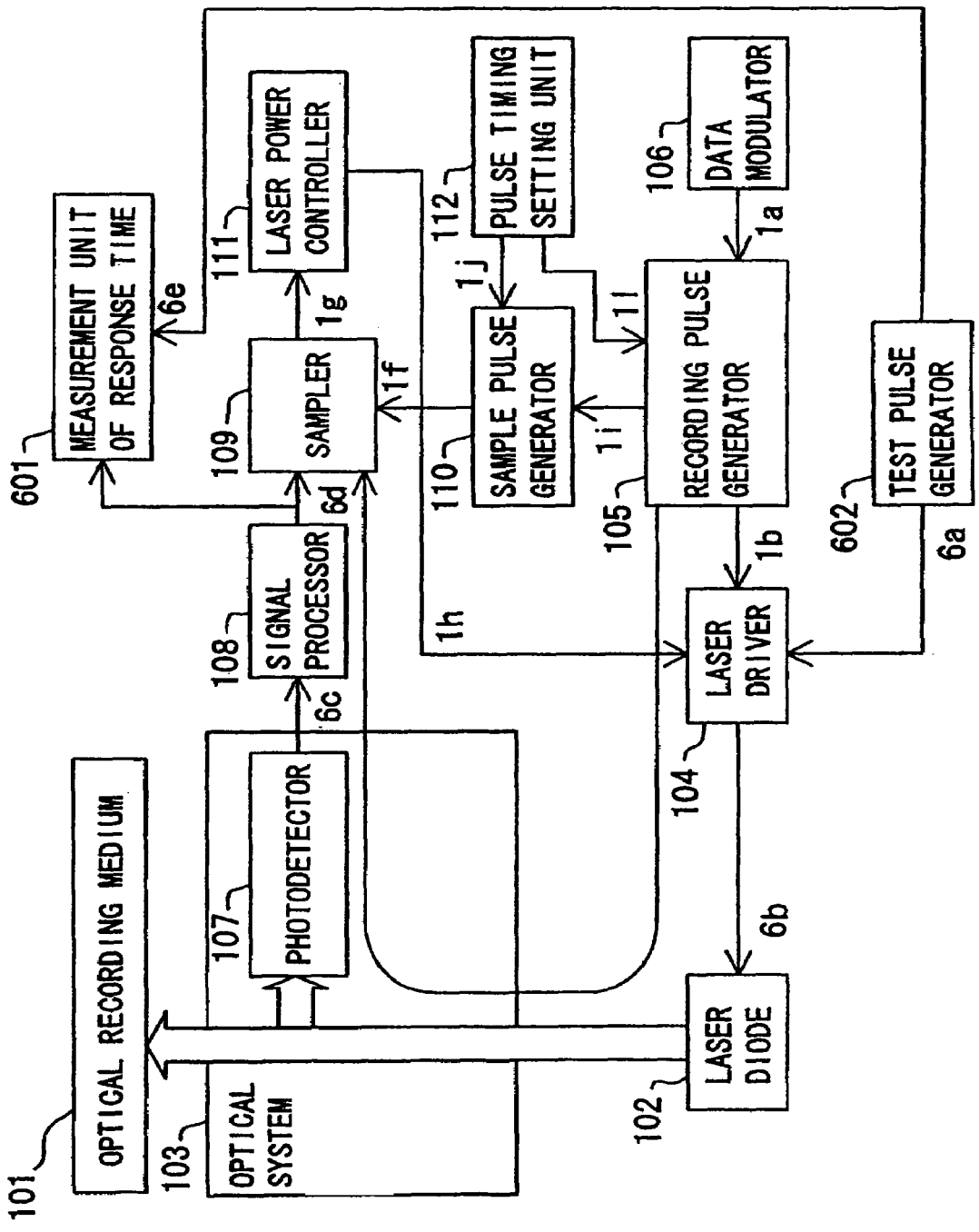
FIG. 4 is a block diagram of an apparatus configuration for measuring the response time of a propagation path.

As mentioned above, the sampling timing (pulse) generator 110 generates the timing tx to start sampling so as to be delayed from the leading end of the first wave of a recording pulse by at least a sum of the propagation delay time Td of the propagation path (that is, the laser driver 104, the laser diode 102, the photodetector 107 and the signal processor 108) and the settling time Ts of the sampler 109. In a technique therefor, the response time had been measured for each component or a combination of the components by sending an input signal and by receiving an output signal, and Td and Ts are set to be appropriate fixed values. The propagation time and the settling time can also be measured on the entire propagation path by a device as shown in FIG. 4 as will be explained later. Thus, the sampling pulse start timing tx can be set based on the measurement. It is also possible to measure the response characteristics of some of the components in the propagation path beforehand and to measure the other components by the measurement under data recording. Thus, the sampling pulse start timing tx can be determined based on the previously determined characteristics and the newly measured characteristics under data recording. In either way, the sampling pulse start timing tx can be changed so as to always have an appropriate value.

Figure 3:
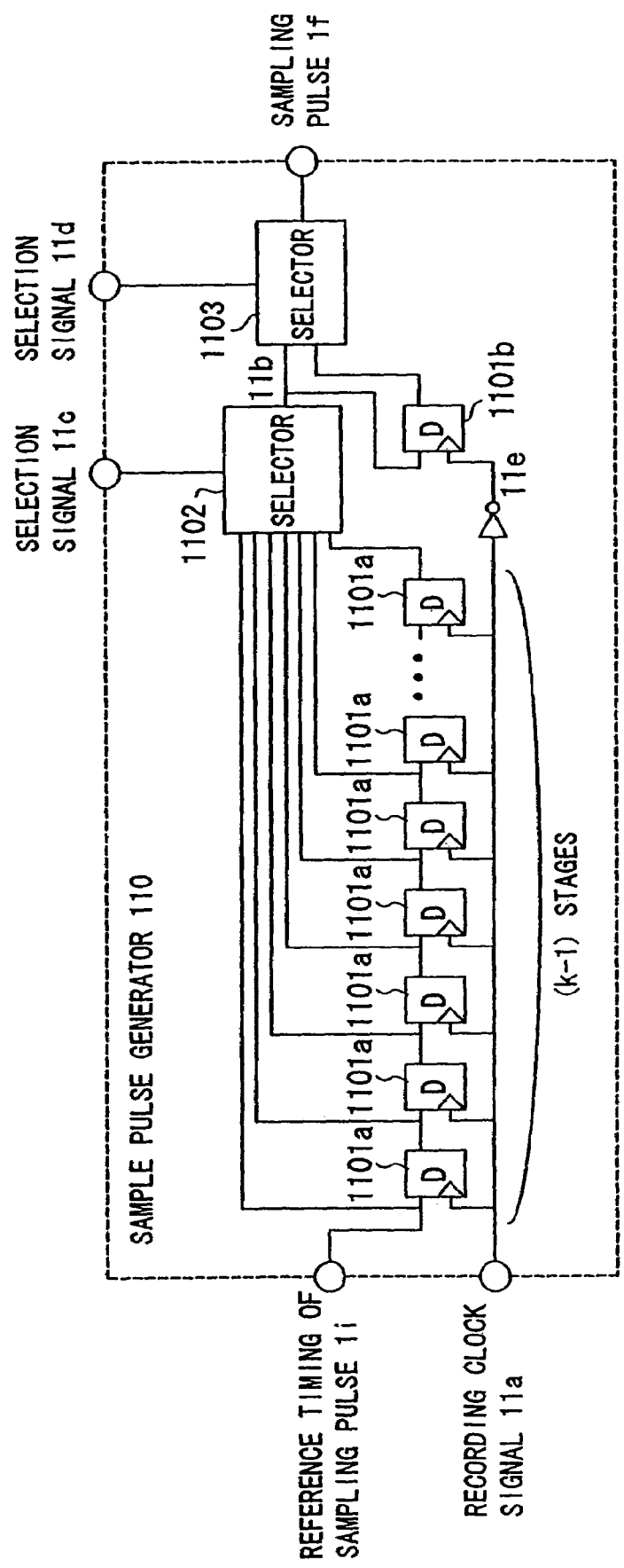
FIG. 3 is a block diagram of an internal configuration of the sampling pulse generator.

Next, a configuration of the sampling pulse generator 110 for generating the timing of a sampling pulse is explained with reference to FIG. 3 which shows an internal configuration of the sampling pulse generator 110. In FIG. 3, numerical references 1101a and 1101b denote D-flip-flops. A recording clock signal 11a having a 1T cycle is supplied to each clock terminal. It is preferable to have the same phase of the recording clock signal 11a as that of a signal which is used by the recording pulse generator 105.

The D-flip-flops 1101a constitute a (k–1) stages shift register and receive the sampling pulse reference timing 1i at an input. A selector 1102 selects one of the sampling pulse reference timing 1i and outputs Q of D-flip-flops at (k–1) stages in accordance with a selection signal 11c. The selected output 11b is further inputted to another D-flip-flop 1101b, and an inverse clock 11e (having a phase shift of 1800 of the recording clock signal 11a) is connected to the clock terminal of the flip-flop 1101b. A selector 1103 selects either the output 11b or Q output of the D-flip-flop 1101b as selected in accordance with a selection signal 11d so as to output the selected output as a sampling pulse 1f.

According to the above-described above configuration, it is possible to easily provide the sampling pulse generator which changes the sampling pulse in a range between 0T and (k−0.5)*T for the sampling pulse reference timing 1$i$ by using the flip-flops.

The sampling pulse reference timing signal 1$i$ has a 3T width which is synchronous with the first wave of the recording pulse 1$b$ for a recording mark length to which the sampling pulse should be output. It is needless to say that the sampling pulse reference timing 1$i$ is not restricted to a 3T width. The width of the sampling pulse reference timing signal 1$i$ may be decided based on the relationship of the necessary acquisition time, and the width thereof can be changed.

Further, the start position of the sampling pulse reference timing 1$i$ is not restricted to being synchronized with the first wave of the recording pulse 1$b$. The start position of the sampling rules reference timing 1$i$ may be decided with reference to the minimum value of (propagation delay time+settling time) of the propagation path. The number of stages k of the D-flip-flops may be estimated in accordance with (maximum value−minimum value) of (propagation delay time+settling time) of the propagation path.

Although the unit of timing is set to 0.5T, the unit of timing is not restricted to 0.5T. It is also possible to set the unit of timing to 1T or 0.25T. In the case of the 1T unit of timing, it is needless to say that the D-flip-flop 1101$b$ at the final stage and the selector 1103 are unnecessary. In the case of the 0.25T unit of timing, it is possible to operate the D-flip-flops at the final stage at a cycle which is ¼ of the cycle of the recording clock signal 11$a$ in accordance with a clock signal whose phase is set to the phase of the recording clock signal 11$a$.

Furthermore, it is preferable to decide the sampling pulse timing basically in accordance with the Expressions (1) and (2). For example, when the propagation delay time of the propagation path is 10 nanoseconds, the settling time thereof is 50 nanoseconds, and the recording frequency thereof is 30 MHz (1T=33 nanoseconds), the sampling pulse start timing tx is as follows by using Expression (1).

$tx > 100 + 50 = 150$ ns.

Because 1T is equal to 33 nanoseconds, $tx > (150 \div 33)T \approx 4.55T$.

Therefore, it is preferable to select a position of five or more stages in terms of the number of stages of the D-flip-flops.

Furthermore, when the aperture time of the sampler 109 is 10 nanoseconds, the minimum recording-mark length n to which a sampling pulse should be output is as follows, $n > (50 \text{ ns} + 3T + 10 \text{ ns})*f$, by using Expression (2). Because $f = 1/T = 30$ MHz, n>4.8.

Therefore, it is preferable to output a sampling pulse to a recording mark of 5T or more.

How to obtain the propagation delay time and settling time of the propagation path will now be explained with reference to FIGS. 4–7.

Figure 5:
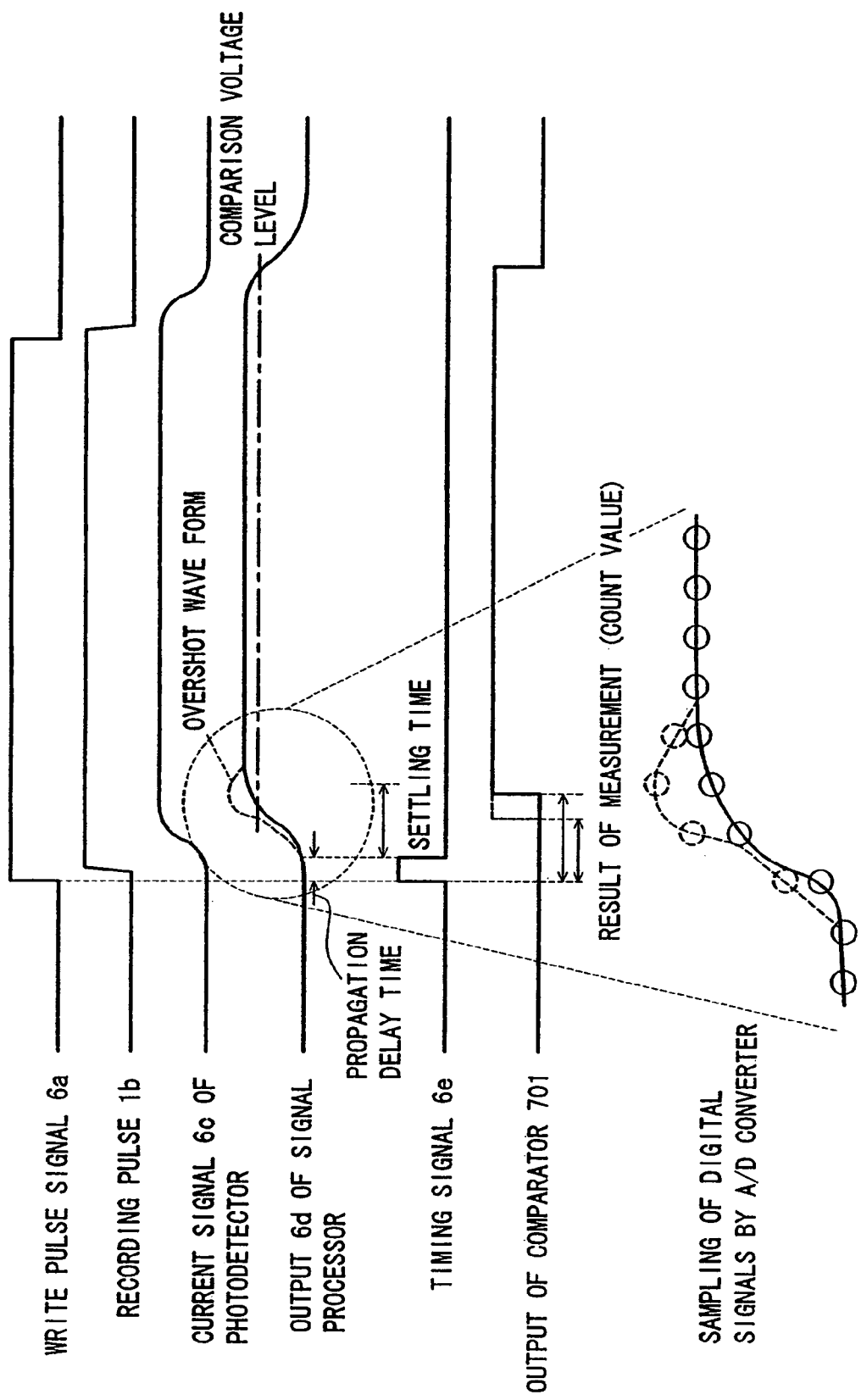
FIG. 5 is a diagram for explaining the response time measurement of a propagation path by a response time measurement unit.

FIG. 4 is a block diagram of a configuration for obtaining the propagation delay time and the settling time of the propagation path by using a test signal. In FIG. 4, components which are provided with the same symbols as those in FIG. 1, that is, an optical recording medium 101, a laser diode 102, an optical system 103, a laser driver 104, and a signal processor 108 are the same as those described for FIG. 1. Therefore, the description of the functions of these components are omitted here. Moreover, FIG. 5 is a timing chart for explaining the operations of the components that are shown in FIG. 4.

A test pulse generator 602 outputs a test pulse signal 6$a$ to the laser driver 104 in the test mode. Because the test pulse signal 6$a$ is outputted so as to measure the response characteristic of the propagation path, it is preferable to use a rectangular wave having a width which is larger enough than the width of a recording pulse signal under a normal operation so that the response characteristic can be stably measured.

The laser driver 104 receives the test pulse signal 6$a$ and applies a driving current 6$b$ to the laser diode 102 so that the laser 102 emits a light beam with a power which is equal to a predetermined recording power.

The laser beam is emitted by the laser diode 102 with the applied driving current 6$b$ and is detected by the photodetector 107 similar to the case of normal recording. Then, a current signal 6$c$ having an amplitude corresponding to the light quantity of the emitted light is outputted from the photodetector 107.

The signal processor 108 outputs an output signal 6$d$ that is obtained by signal processing such as an I/V conversion on the input current signal 6$c$ to the response time measurement unit 601, similar to the case of normal recording. A timing signal 6$e$ indicating the start of measurement of a response time is separately inputted to the response time measurement unit 601 by the test pulse generator 602. It is possible that the timing signal 6$e$ is the same as the test pulse signal 6$a$.

Figure 6:
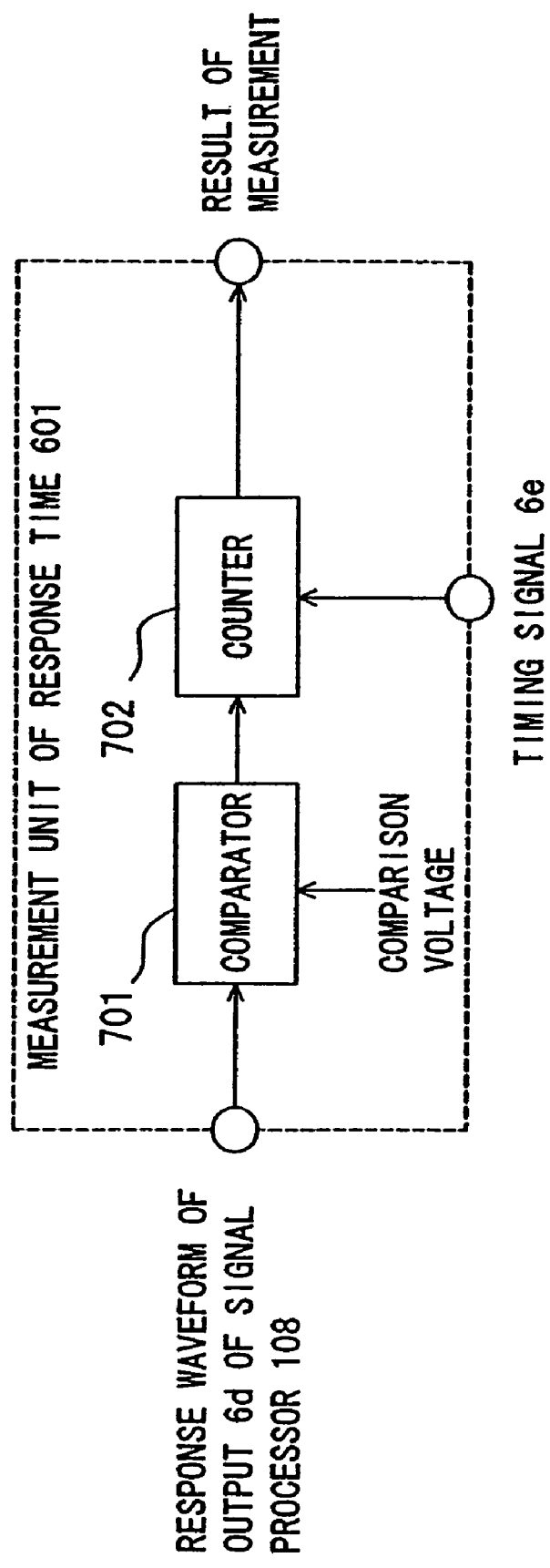
FIG. 6 is a block diagram of an internal configuration of the response time measurement unit.

FIG. 6 shows an internal configuration of the response time measurement unit 601. The response time measurement unit 601 comprises a comparator 701 for comparing the input signal 6$d$ that is supplied from the signal processor 108 with a predetermined voltage level, and a counter 702 for measuring the delay time of an output signal of the comparator 701 and the timing signal 6$e$ that is supplied from the test pulse generator 602.

In the test mode, when the leading end (change point from low level to high level) of the test pulse signal 6$a$ is applied, the output signal 6$d$ of the signal processor 108 rises in accordance with the response characteristic of the propagation path after a predetermined time elapses. When the output signal 6$d$ of the signal processor 108 becomes higher than a preset comparison-voltage level, the comparator 701 outputs a high level. It is necessary to adjust the comparison voltage level so that the portion of a deteriorated waveform under settling is kept lower than the high level and the portion where the waveform is completely settled surely becomes a high level.

The counter 702 measures the time from the leading end of the timing signal 6$e$ to the leading end of the output signal of the comparator 701 by counting the time with fixed-frequency clock signals. It is preferable that the cycle of the clock signal is equal to or longer than the timing change unit of the sampling pulse.

As described above, it is possible to measure the response time of the propagation path with a simple configuration by using the comparator 701 and the counter 702. It is preferable to decide the value of the sampling pulse timing setting 1$j$ of the sampling pulse generator 110 described above in FIG. 1 under normal recording, based on the response time that is measured in the test mode.

Figure 7:
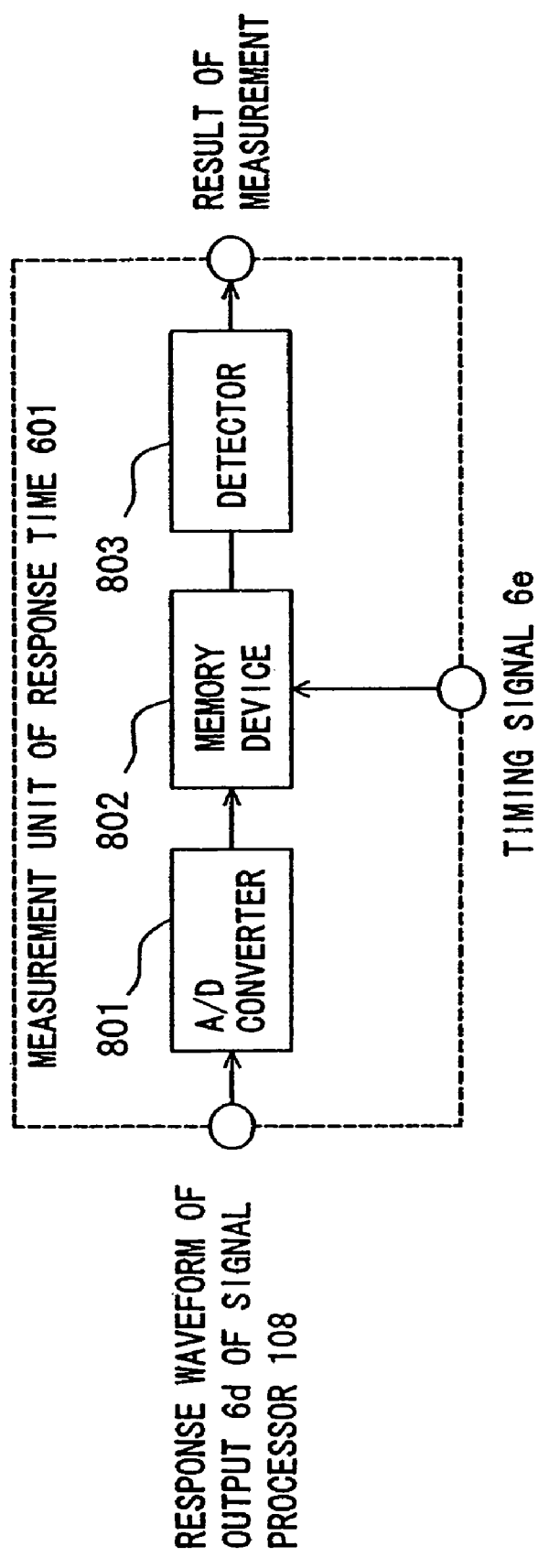
FIG. 7 is a block diagram of another internal configuration of the response time measurement unit.

FIG. 7 shows another configuration of the response time measurement unit 601. The response time measurement unit 601 according to this configuration comprises an analog-to-digital (A/D) converter 801 which converts the analog waveform of an output 6d of the signal processor 108 to a digital signal, a memory device 802 for storing the digital data after the analog-to-digital conversion by the A/D converter 801, and a detector 803 for detecting the leading end of waveform from the stored digital signal so as to measure the time relationship with the timing signal 6e showing the start position of the test pulse signal 6a.

The digital signal corresponding to the output signal 6d of the signal processor 108 which is converted by the A/D converter 801 is stored in the memory device 802 synchronously with the timing signal 6e indicating the start of the measurement of the response time. It is preferable that the acquisition interval of digital-signal sampling with the memory device 802 is equal to or longer than the timing change unit of the sampling pulse. The memory device 802 may be comprised of a first-in first-out memory or a random access memory such as an SRAM or DRAM. The detector 803 reads the value of a digital signal sample that is stored in the memory device 802 and detects the sample in the portion of the leading end. It is preferable to detect the sample of the portion where a waveform is completely settled by excluding the portion of a deteriorated waveform under settling. It is possible to determine the response time of the propagation path from the position of the detected sample.

As described above, in the configuration shown in FIG. 7, it is possible to detect the position of the leading end by confirming the transient value of the digital signal sample that is stored in the memory device 802. Therefore, even if the amplitude level of the output signal 1d that is received by the signal processor 108 changes or the waveform under settling overshoots, it is possible to prevent the position of the leading end from being undetected or erroneously detected. Therefore, it is possible to more stably measure the response time of the propagation path compared to the configuration of the comparator and the counter shown in FIG. 6.

The configuration shown in FIG. 7 is slightly more complex than the configuration shown in FIG. 6. However, if the A/D converter 801 and the memory device 802 can be shared with other functional blocks, the cost will not increase. For example, in an optical information recording/reproducing apparatus, when a part or the whole of reproduction signal processor comprises a digital circuit, it is preferable to share the component because a high-speed A/D converter is generally used. Moreover, because a buffer memory is often used for an optical disk drive in order to temporarily store recording data or reproduction data, it is preferable to share the buffer memory. Furthermore, when the detector 803 uses a digital signal processor (DSP) or a central processing unit (CPU) that is provided for another function, it is possible to realize the function through software processing by using the DSP or CPU.

In the above description, the response time of the output signal 6d of the signal processor 108 to the test pulse signal 6a is measured at the leading end of the output signal 6d. However, it is also possible to measure the response time at the trailing end of the output signal 6d when necessary or to use the measurement at the leading end and the measurement at the trailing end together.

Moreover, in the test mode, it is unnecessary to emit a laser beam to the optical recording medium 101 because only the response time of the propagation path is measured.

Furthermore, the response time measurement unit 601 and the test pulse generator 602 may or may not be set in the optical information recording apparatus shown in FIG. 1. When setting the response time measurement unit 601 and the test pulse generator 602 in the optical information recording apparatus, it is possible to measure the response characteristic of the propagation path by setting the test mode while the optical information recording apparatus is actually operating. Therefore, even if response characteristics of the propagation path are changed due to a change of ambient temperatures or a fluctuations of power-supply voltage while the optical information recording apparatus operates, it is always possible to keep the timing of sampling pulse properly corresponding to such changes or fluctuations.

When the response time measurement unit 601 and the test pulse generator 602 are not mounted in the optical information recording apparatus, it is necessary that the recording pulse signal 1b or an input of the laser driver 104 can be controlled externally before the optical information recording apparatus is shipped and that the monitoring voltage signal 1e that is supplied from the signal processor 108 can be monitored externally. When these conditions are satisfied, it is possible to individually adjust the value of the sampling pulse timing setting 1j by measuring the response characteristic of the propagation path before shipment of the optical information recording apparatus. Therefore, if the response characteristic are different among the apparatuses, it is possible to properly keep the timing of sampling pulse by adjusting them for each optical information recording apparatus. Because the response time measurement unit 601 or the test pulse generator 602 is not equipped in the optical information recording apparatus, the cost of the apparatus can thereby be reduced.

Even when the response time measurement unit 601 and the test pulse generator 602 are not set in the optical information recording apparatus, if means for monitoring the power supply voltage and the ambient temperature are newly added, it is always possible to properly keep the timing of sampling pulse corresponding to the fluctuations in the power-supply voltage or ambient temperature.

Figure 8:
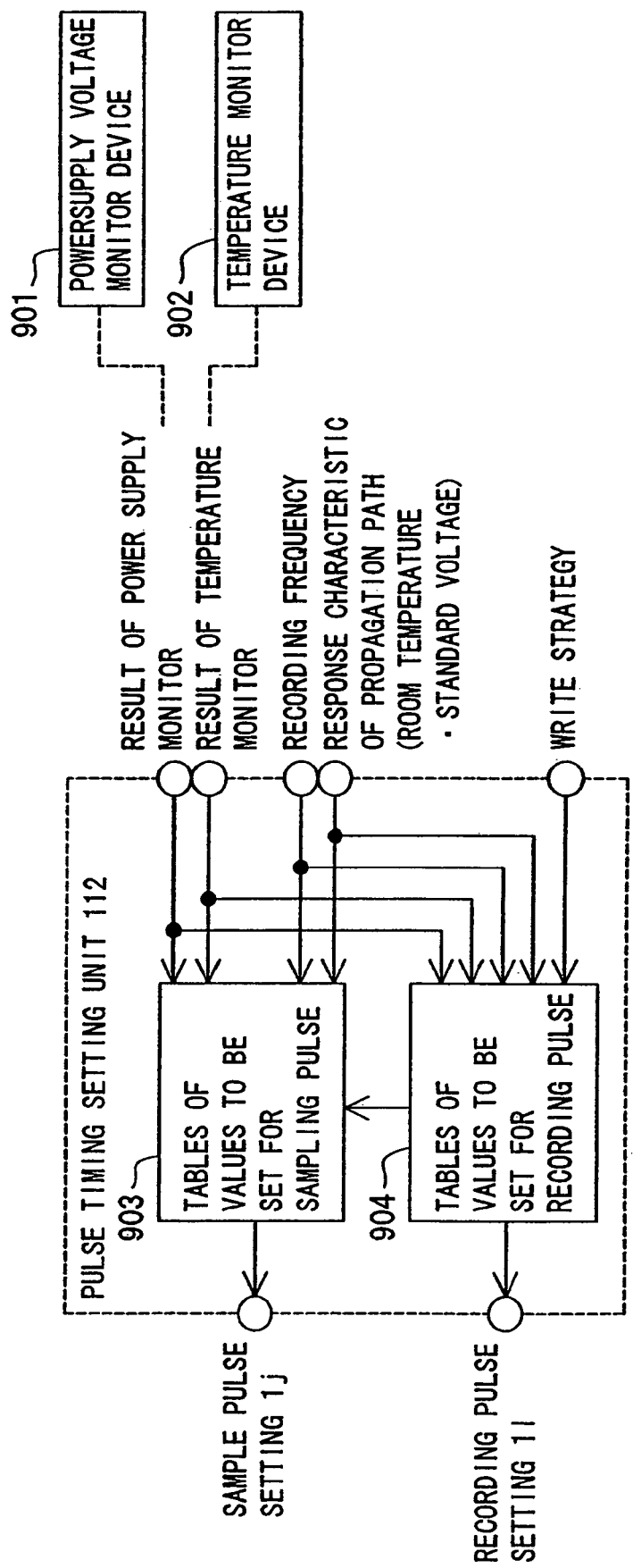
FIG. 8 is a block diagram of a pulse timing setting unit and its peripheral configuration.

An example for realizing the above-described method is described below with reference to FIG. 8, which shows an internal and peripheral configuration of the pulse timing setting unit 112.

A pulse timing setting unit 112 includes a first table 903 of values to be set for a sampling pulse and a second table 904 of values to be set for a recording pulse. The first table 903 is used for deciding the value of the sampling pulse setting 1j by using the recording frequency, the response characteristic of the propagation path (or the response characteristic that is measured beforehand at room temperature and at a normal voltage), the result of power-supply-voltage monitoring, and the result of temperature monitoring as parameters. The power-supply-voltage monitoring result uses an output of a power-supply-voltage monitoring device 901. The temperature monitoring result uses an output of a temperature monitoring device 902.

The second table 904 decides the recording pulse setting 1l in accordance with a predetermined recording strategy, and decides a mark length to which a sampling pulse should be output by using the recording frequency, the propagation-path response characteristic, the result of power-supply-voltage monitoring, and the result of temperature monitoring as parameters.

The first and second tables 903 and 904 may comprise a read only memory (ROM) which stores a set value for parameter inputs or a computer unit for obtaining a set value by applying parameter inputs to the above Expressions (1) or (2), or with the use of a software processing. For example, when factors of power-supply-voltage fluctuation and ambient-temperature fluctuation are taken into account, Expressions (1) and (2) are rewritten as follows;

$$tx > (Td+Ts)*(1-p*v)*(1+q*t), \quad (5)$$

and $$n > \{Ts*(1-p*v)((1+q*t)+Tw+Ta\}*f, \quad (6)$$

wherein p denotes a power-supply fluctuation coefficient, q denotes a temperature fluctuation coefficient, v denotes a difference between the reference power-supply voltage and the result of monitoring a power-supply voltage, and t denotes a difference between the room temperature and the result of monitoring the temperature. In general, because the propagation delay time and the settling time are shortened as the power-supply voltage rises, the power-supply fluctuation coefficient is set to have a negative value (−p). Moreover, in general, because the propagation delay time and the settling time are increased as ambient temperature rises, the temperature fluctuation coefficient is set to a positive value (+q).

The above expressions are formulated by assuming that the propagation delay time Td and the settling time Ts are affected by the power-supply-voltage fluctuation and the ambient temperature fluctuation. However, Tw and Ta may similarly be multiplied by a coefficient by assuming that the acquisition time and the aperture time are also affected by fluctuations thereof. Moreover, the propagation time and the settling time may be formulated by using different values for the power-supply fluctuation p coefficient and temperature fluctuation coefficient q.

By setting the pulse timing setting unit in an optical information recording apparatus, it is always possible to properly keep the timing of the sampling pulse corresponding to the fluctuations of power-supply voltage or ambient temperature without using the response time measurement unit 601 and the test pulse generator 602.

The test pulse generator 602 may be used together with the recording pulse generator 105. That is, the recording pulse generator 105 can be operated so as to generate a recording pulse 1b in accordance with the modulated data 1a in the normal recording mode and to generate a test pulse signal 6a to measure the response characteristic of the propagation path in the test mode. Thus, the increase in the cost of setting the test pulse generator 602 to the apparatus is almost diminished.

Two types of configurations of the response-time measurement unit 601 for measuring the response time of the propagation path are described above. However, it is needless to say that a configuration of the response time measurement unit 601 is not restricted to the above-described two types.

A method for detecting the power (recording power) for forming a recording mark is described for the first embodiment. However, the first embodiment is not restricted to the formation of recording marks. For example, it is possible to use this technique for detecting the power of a portion (space portion) at which no recording mark is formed.

A recording method is proposed for a rewritable phase-change medium that is applied to a DVD-RAM or the like, which changes three or more levels of a laser power for recording such as the peak power for forming a recording mark by making the recording film amorphous, the bias power for forming a space portion by crystallizing the recording film, and the bottom power for forming a recording mark by a multi-pulse. It is possible that the method and configuration described for the first embodiment can be applied to the detection of any power level in addition to the above-described three power levels.

In the first embodiment, as described with reference to a plurality of drawings, it is shown that the light quantity of emitted laser beam can always be accurately detected at an optimum timing by changing the timing of a sampling pulse for the sampler in accordance with the response time of the propagation path from the generation of a recording pulse signal to the sampler through signal processing such as the photodetector and the I/V conversion. Thus, it is always possible to optimally control the laser power and to improve the recording reliability of the optical information recording apparatus.

In the first embodiment, the concept of the present invention is applied to the detection of the light quantity of an emitted laser beam and to the control of laser power. In a next embodiment, however, the concept of the present invention is applied to the detection of the light quantity of a laser beam that is emitted to and reflected from an optical recording medium.

Second Embodiment

Figure 9:
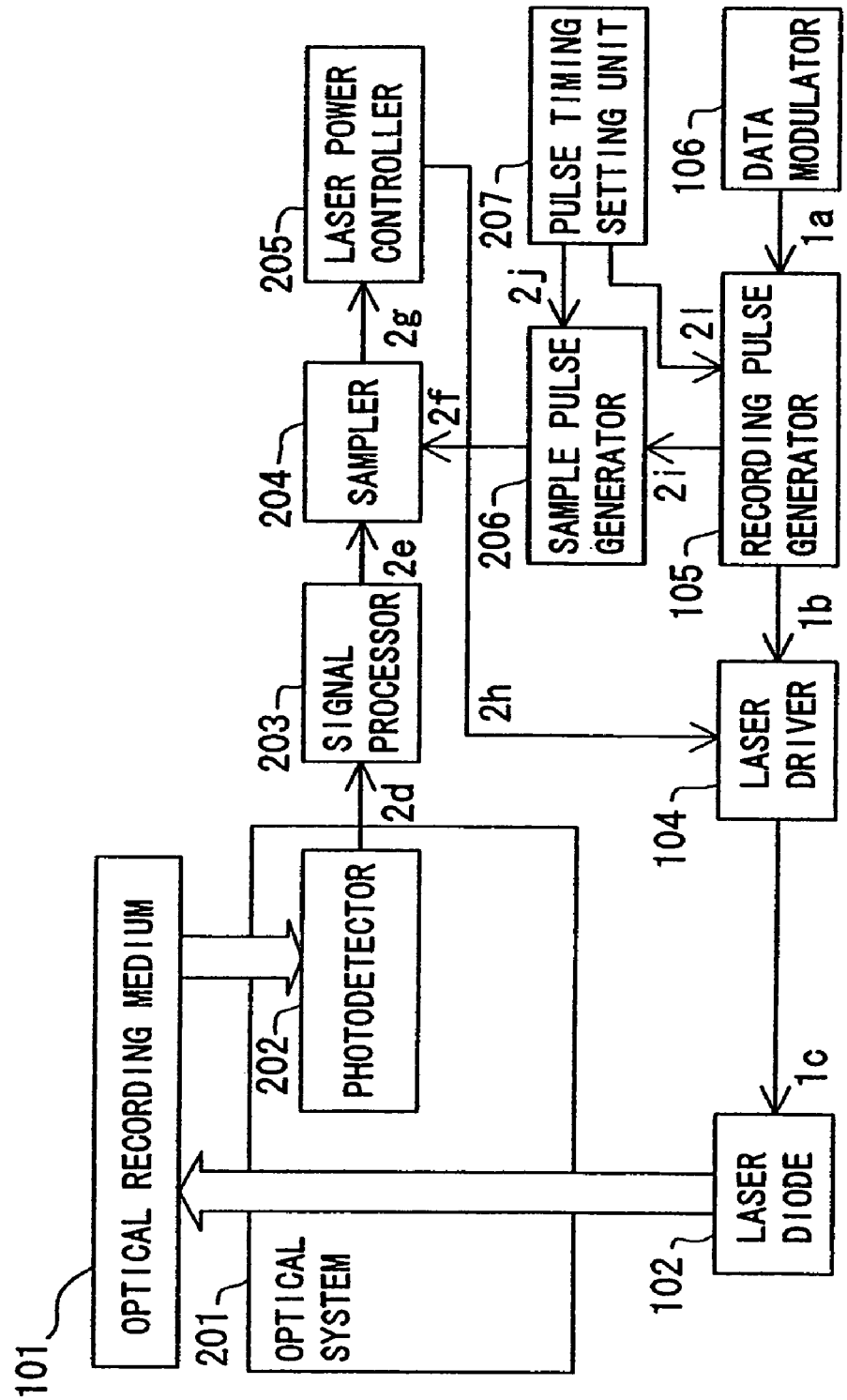
FIG. 9 is a block diagram of the configuration of an optical information recording apparatus according to a second embodiment of the present invention.

FIG. 9 is a block diagram of an optical information recording apparatus according to a second embodiment of the present invention. In FIG. 9, components having the same reference numerals as those in FIG. 1, that is, an optical recording medium 101, a laser diode 102, a laser driver 104, a recording pulse generator 105, and a data modulator 106 are the same as those as described above with reference to FIG. 1. Therefore, the explanation of these components is omitted here.

In FIG. 9, an optical system 201 includes a photodetector 202 for detecting the light quantity of the laser beam that is emitted to and reflected from the recording face of the optical recording medium 101. The photodetector 202 outputs a current signal 2d having an amplitude corresponding to the intensity of the reflected light (laser beam).

A signal-processor 203 outputs a monitoring-voltage signal 2e that is obtained by using signal processing such as the I/V conversion to an output current 2d of the photoconductor 202 to a sampler 204. The sampler 204 samples-and-holds the monitoring voltage signal 2e at the timing of a sampling pulse 2f that is supplied from a sampling pulse generator 206. The output 2g of the result of the sampling-and-holding by the sampler 204 is supplied to a laser power controller 205.

The laser power controller 205 sets a recording power setting value 2h of the laser driver 104 in accordance with the output 2g that is sampled by the sampler 204. For example, the laser power controller 205 adjusts the recording power setting value 2h so that the output 2g corresponding to the monitoring result of the light quantity of the light beam that is reflected from the optical recording medium 101 has a certain amplitude level.

By monitoring the light quantity of light beam that is reflected from an optical recording medium under the recording, it is possible to understand the state for forming a recording mark. For example, the laser power controller 205 can be applied so as to form a recording mark through thermal decomposition or substrate deformation of a recording film which is made of an organic-dye-based material such as DVD-R by irradiating the laser beam to a recording medium having such a recording film. A method of controlling the recording power in accordance with the reflected-light quantity from an optical recording medium under the recording is known as the R-OPC as described above.

The timing of the sampling pulse 2f by the sampling pulse generator 206 is decided in accordance with the following factors:

(1) propagation delay time;
(2) settling time;
(3) data recording frequency; and
(4) type of optical recording medium.

In the second embodiment, the propagation delay time in the above factor (1) denotes a sum of the delay times in the propagation path of the light beam that is emitted by the laser diode to and reflected from an optical recording medium, that is, the sum of the delay times in the propagation path which is formed between the laser driver 104, the laser diode 102, the optical recording medium 101, the photodetector 202, and the signal processor 203.

The settling time in the above factor (2) denotes the time until waveform deterioration which is caused by each component in the propagation path converges similar to the description for the first embodiment. The setting time depends on the frequency characteristic of each factor.

The data recording frequency in the above factor (3) relates to the time length of a recording mark. As described for the first embodiment, a recording mark length to which a sampling pulse should be outputted must be at least longer than the sum of the settling time of the propagation path and the necessary acquisition time and the necessary aperture time of the sampler 204.

The type of optical recording medium in the above factor (4) can also be the type of material of a recording film. Since it is an object to obtain a recording-mark forming state by monitoring a reflected-light quantity, it is necessary to control the optimum power so as to monitor the light quantity of the reflected light beam at a position where a change in the reflected-light quantity is maximized. However, the change point of the light quantity depends on the sensitivity of a recording film.

FIGS. 10A–10C illustrate the relationship between the sensitivity of a recording film, a light quantity and an optimum monitoring position. When a high laser power due to recording a multi-pulse as shown in FIG. 10A is applied, formation of a recording mark is quickly progressed when a recording film has a high sensitivity. Therefore, as shown in FIG. 10B, the light quantity of the reflection light is changed quickly. On the other hand, when a recording film has a low sensitivity, the light quantity is changed slowly as shown in FIG. 10C because it takes a longer time to form a recording mark. The optimum monitoring position of the light quantity differs as illustrated in FIGS. 10B and 10C. The time from the start of the first wave of a recording pulse to the optimum monitoring position is defined as a delay time in forming recording marks.

In short, the start timing of a sampling pulse is determined in accordance with the propagation delay time and the settling time of the propagation path and the recording-mark formation delay time after a rise of the first wave in a recording pulse. The width of the sampling pulse is set to a value which is longer than the necessary acquisition time of the sampler 204. Further, a recording-mark length to which a sampling pulse should be output is decided by considering the sum of the settling time of the propagation path and the necessary acquisition time and the necessary aperture time of the sampler 204 with the delay time of forming a recording mark.

A sampling pulse start timing ty and a minimum recording-mark length to which a sampling pulse should be outputted can be shown by the following formulae, $$ty > \{Td + F(Ts+Tm)\}, \text{ and} \quad (3)$$

$$m > \{F(Ts+Tm) + Tw + Ta\} * f, \quad (4)$$

wherein Td denotes a propagation delay time of a propagation path, Ts denotes a propagation path settling time, Tm denotes a delay time of recording-mark-formation, f (=1/T) denotes a recording frequency, Tw denotes a sampling pulse width, and Ta denotes an aperture time of the sampler 109. In this case, F(Ts+Tm) denotes a function to define a square root of a sum of squares of Ts and Tm, $(Ts^2+Tm^2)^{1/2}$. The settling time Ts and the recording mark formation delay time Tm are additional factors that are different from the propagation delay time Td. Because Ts and Tm are events which are independent of each other, they can be estimated by the above-mentioned addition of squares.

It is preferable to decide the timing of a sampling pulse by basically using Expressions (3) and (4). It is preferable to generate the sampling pulse 2f by the sampling pulse generator 206 in accordance with the process and the configuration of the embodiment shown in FIG. 3 and the like.

Moreover, the response time (the propagation delay time and the settling time) of the propagation path is the same as that explained above in the first embodiment, except that the detection of a light quantity is performed on the light beam that is reflected from an optical recording medium. Therefore, the explanation of the response time of the propagation path is omitted here. Since it is necessary to detect the light quantity of the reflected light beam, it is needless to say that it is necessary to apply a laser beam to the optical recording medium 101 similar to the case of normal recording also in the test mode for measuring the response time.

As mentioned above in the description of the second embodiment with reference to the drawings, it is always possible to accurately detect the light quantity of emitted laser beam at an optimum timing by changing the timing of a sampling pulse to the sampler in accordance with the response time of the propagation path from the recording pulse signal to the sampler through the laser diode, the optical recording medium, the photodetector, and the signal processing such as the I/V conversion.

Moreover, because the time up to the formation of a recording mark depends on the type of optical recording medium, it is shown to change timings of a sampling pulse in accordance with the delay time of the formation of the recording mark. Thus, it is always possible to optimally control the laser power and to improve the recording reliability of an optical information recording apparatus.

A method for detecting the power (recording power) to form a recording mark is described above for the second embodiment, and a method for detecting the power is not restricted to this method. For example, it is possible to use a method for detecting the power of a portion (space portion) in which no recording mark is formed.

Moreover, a recording method is proposed for a rewritable phase-change medium which is applied to a DVD-RAM and the like, which changes three or more laser power levels such as the peak power for forming a recording mark by making a recording film amorphous under the recording operation, the bias power for forming a space portion by crystallizing a recording film, and the bottom power for forming a recording mark by a multi-pulse under the recording operation. It is possible to apply the method and configuration as described above for the second embodiment to the detection of any one of the above three or more power levels.

In the second embodiment, the monitoring result of the light quantity of the light beam that is reflected from an optical recording medium under the recording operation is used for the control of recording laser power. However, the use of the monitoring result is not restricted to the above-described case. For example, it is also possible to use the monitoring result as tracking servo system detection signal (tracking error signal) in order to stabilize the laser-beam tracking under the recording operation.

Third Embodiment

Figure 11:
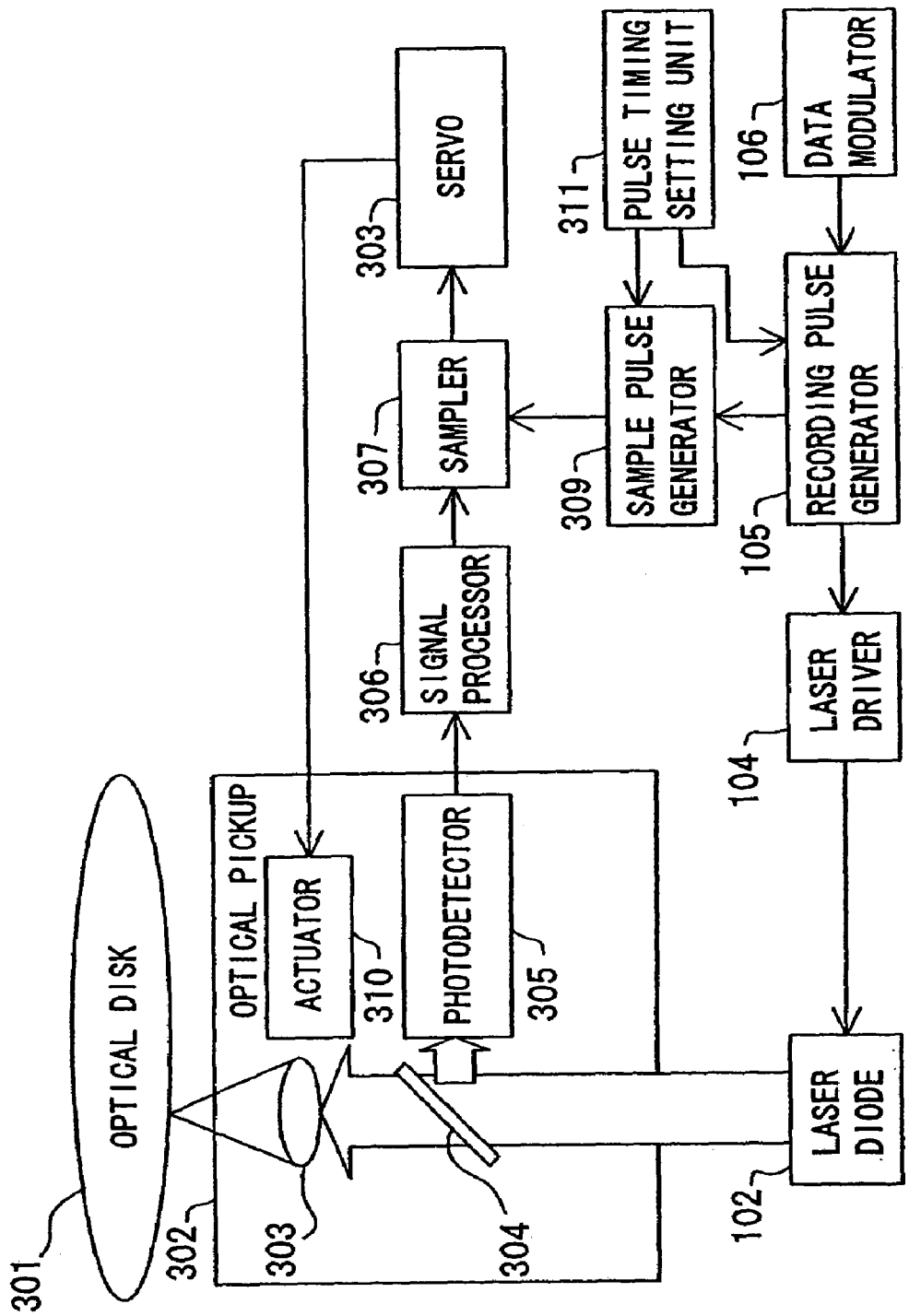
FIG. 11 is a block diagram of the configuration of an optical information recording apparatus according to a third embodiment of the present invention.

FIG. 11 shows a third embodiment an optical information recording apparatus of the present invention on the detection of reflected light. In FIG. 11, the components having the same reference numerals as those in FIGS. 1–2 and 9, that is, a laser diode 102, a laser driver 104, a recording pulse generator 105, and a data modulator 106 are the same as those in FIGS. 1–2 and 9 and therefore, the description of these components is omitted here. In the optical information recording apparatus shown in FIG. 11, a laser beam that is emitted from the laser diode 102 is condensed by an object lens 303 mounted in an optical pickup 302 and applied to the recording face of an optical disk 301.

Although not illustrated in FIG. 11, the optical disk 301 is rotated by a spindle motor or the like, and the laser beam is controlled with respect to tracking and focusing so that the laser beam is guided along a guide groove (track) which is formed on the recording face. That is, the object lens 303 is positioned by driving an actuator 310 so that information can be recorded or reproduced.

The light that is reflected from the optical disk 301 enters a photodetector 305 through a prism mirror 304, and the reflected light is converted to a current signal. Although not shown, the photodetector 305 is divided into a plurality of photo-detecting sections. Then, it is possible to detect the light quantity of the light beam that is reflected from the optical disk 301 by each of the divided photo-detecting sections so as to output a detection current from each photo-detecting section of the photodetector. For example, when the photodetector 305 is divided into two sections in the tracking direction of the optical disk 301, it is possible to obtain a tracking error signal according to the known push-pull process, by obtaining the difference between outputs of the two divided sections of the photodetector 305 from a signal processor 306.

The signal processor 306 performs proper signal processing such as I/V conversion and addition/subtraction of signals of the divided photo-detecting sections of the photodetector 305. A signal that is processed by the signal processor 306 is sampled-and-held by a sampler 307 at the timing of a sampling pulse which is supplied from a sampling pulse generator 309.

The timing of a sampling pulse is changeable in accordance with the setting of a pulse timing setting unit 311, and the details of the changing process have been previously explained for the second embodiment. That is, the timing of a sampling pulse and a space length to which the sampling pulse should be outputted may be changed in accordance with the response time of the propagation path of the reflected light. The light quantity that is reflected from a space portion does not fluctuate much depending on the type of a recording medium under data recording. Therefore, the timing of a sampling pulse may not be changed in accordance with the type of a recording medium in the third embodiment.

According to the above-mentioned configuration, only a space portion is used for the sampling period of the tracking error signal, and a holding period is assigned to a recording mark portion to which a high power laser beam is applied according to a recording pulse. Therefore, it is possible to decrease the fluctuations of a tracking error signal under data recording due to a leak of a recording pulse. Thus, the S/N ratio of a tracking error signal under data recording is remarkably improved, and the stability of tracking control can be improved.

Moreover, the monitoring result of the light quantity of the reflected light beam may be sampled-and-held at a variable timing of the sampling pulse. Then, detection signals for clock reproduction which are recorded on an optical recording medium can be obtained stably under the recording. Furthermore, the monitoring result of the light quantity of the reflected light beam may be binarized by using two types of binarization means having binarization slice levels which are different from each other and selecting the result in accordance with the selection signal for variable timing. Then, the detection signal for reproducing prepit address(es) which is(are) recorded in an optical recording medium can be obtained stably under recording.

Fourth Embodiment

Figure 12:
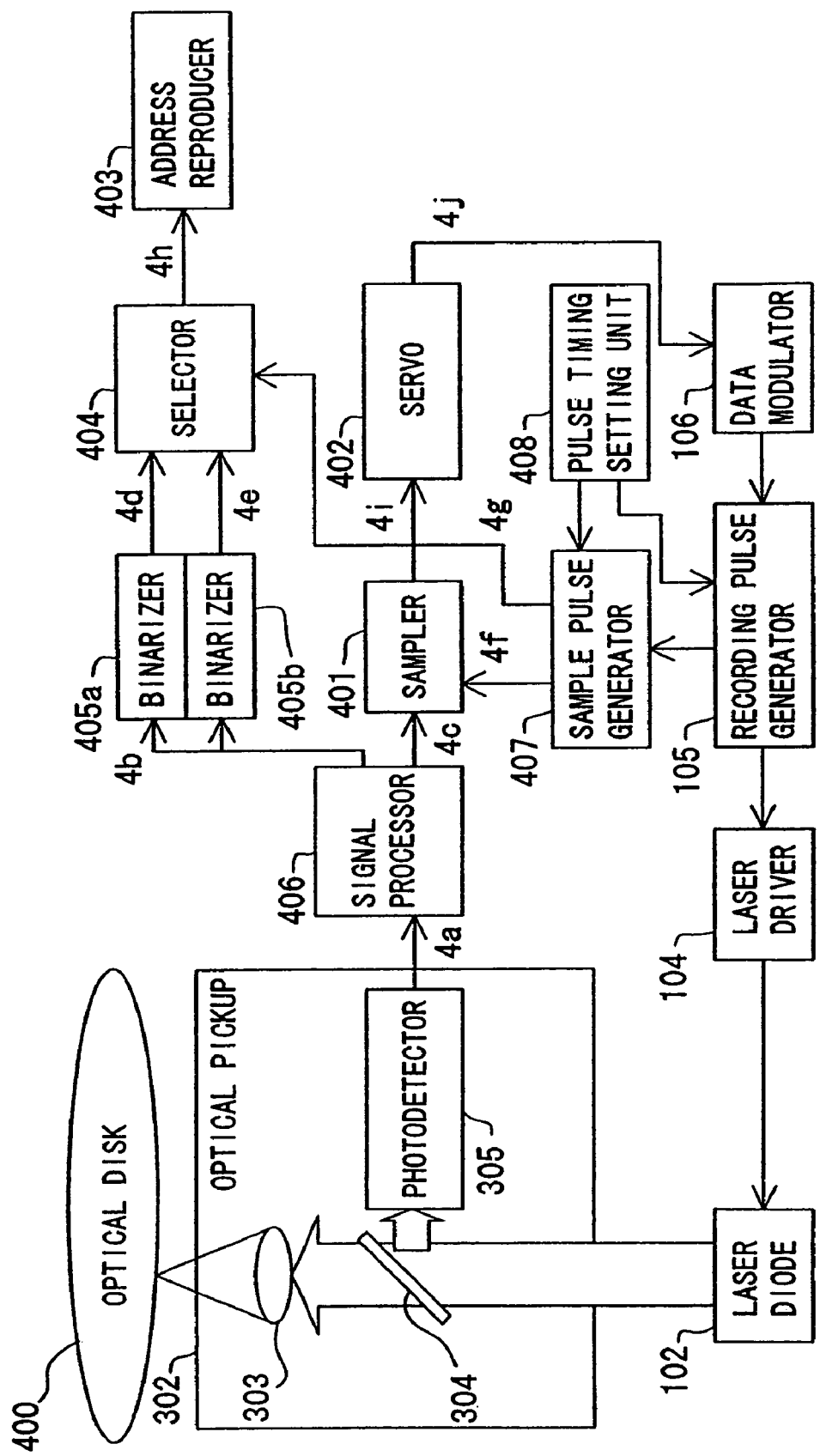
FIG. 12 is a block diagram of the configuration of an optical information recording apparatus according to a fourth embodiment of the present invention.

FIG. 12 shows an optical information recording apparatus according to a fourth embodiment of the present invention which also uses a sampling-and-holding result of the light quantity of reflected light. In FIG. 12, components which are provided with the same reference numerals as those in FIGS. 1, 4, 9 and 11, that is, a laser diode 102, laser driver 104, recording pulse generator 105, data modulator 106, an optical pickup 302, an object lens 303, a prism mirror 304, and a photodetector 305 are the same as those described for FIGS. 1, 4, 9 and 11. Therefore, the explanation of these components is omitted here.

Although not shown explicitly, an optical disk 400 includes information for obtaining recording clocks serving as a criterion for data recording and for determining an address for managing the position of data. The recording clocks and the information had been recorded.

The information for obtaining recording clocks uses, for example, a wobble groove that is used for an optical disk format such as DVD-R, DVD-RW, or DVD-RAM. A wobble groove has a guide groove meandering at a predetermined cycle which is formed spirally or concentrically in an optical disk along an information track. Because the guide groove meanders in the radial direction of the optical disk, that is, a direction which is vertical to the beam tracking direction, it is possible to reproduce a wobble signal serving as a signal component corresponding to the meandering cycle of the wobble groove by using the tracking error signal according to the known push-pull process. By using a phase-locked loop circuit for multiplication in accordance with the wobble signal, it is possible to reproduce a clock signal having a multiplied frequency of the meandering cycle of the wobble groove and to use the clock signal as a reference clock for data recording.

Moreover, the information for obtaining the address uses, for example, a land prepit that is used for an optical disk format of DVD-R or DVD-RW. In general, in an optical disk, a portion of a guide groove which is spirally or concentrically precut is referred to as groove and another portion between a groove and an adjacent groove is referred to as land. The land prepit is constituted by forming a pit at a portion of land at a predetermined interval when cutting an optical disk so as to store the address information.

In optical disk format such as DVD-R or DVD-RW, user data is recorded in a groove. Therefore, a beam spot of an information recording apparatus is controlled with respect to tracking so as to follow the center of the groove. Because the land prepit is detected at a position that is shifted from the beam spot, it is possible to reproduce the user data by using a tracking error signal according to the known push-pull process similar to the case of the wobble signal.

In the optical information recording apparatus shown in FIG. 12, recording clocks are obtained by detecting signals for reproducing clocks which are recorded beforehand on the optical disk 400. Therefore, the output of the sampler 401 that is obtained by sampling-and-holding is inputted to a recording clock generator 402. Moreover, in order to obtain the address information of a physical position in an optical disk from the detection signal for address reproduction which is previously recorded on an optical disk, one of binarized signals that are binarized at two binarization slice levels which are different from each other is selected and inputted to address reproduction device 403.

In detail, a detection current 4a that is detected by the photodetector 305 under data recording is subjected to proper processing such as I/V conversion and filtering in a signal processor 406. Then, a reproduction signal 4b containing a signal component corresponding to land prepit information and a reproduction signal 4c containing a signal component corresponding to the meandering cycle of a wobble groove are generated and outputted from the signal processor 406.

The reproduction signal 4b is inputted to binarizers 405a and 405b. The binarizer 405a binarizes the reproduction signal 4b for lower laser power portions under data reproducing and recording, and its binarization slice level is set to a level which is capable of binarizing and extracting land prepit information under low-laser power irradiation. On the other hand, the binarizer 405b binarizes the reproduction signal 4b for a high laser power portion under data recording, and its binarization slice level is set to a level which is capable of binarizing and extracting land prepit information under high laser power irradiation. That is, the binarization slice level of the binarizer 405b is set to a level which is higher than the binarization slice level of the binarizer 405a.

As described above, either of binarized signals 4d and 4e that are obtained by the two types of the binarizers 405a and 405b, respectively, is selected by the selector 404 and outputted to the address reproduction device 403 as a land prepit binarized signal 4h. The binarized signal 4d or 4e is selected by a selector 404 in accordance with a timing signal 4g for selection supplied from a sampling pulse generator 407.

The reproduction signal 4c is inputted to the sampler 401. The sampler 401 samples-and-holds the reproduction signal 4c at the timing of a sampling pulse 4f that is supplied from the sampling pulse generator 407, and outputs the sampled-and-held signal 4i to a recording clock generator.

The sampling pulse generator 407 changes the timing of the sampling pulse 4f and the timing of the selection-timing signal 4g in accordance with the setting of a pulse timing setting unit 408. Details of the changing process are explained above for the second embodiment. That is, the start timing of the sampling pulse 4f, the change timing of the selection timing signal 4g, and the space length to which the sampling pulse 4f should be outputted may be changed in accordance with the response time of the propagation path of the reflected light of the laser beam. Further, because the light quantity at a space portion does not vary largely with the type of the recording medium, it may be unnecessary to change these timings in accordance with the type of the recording medium in the fourth embodiment.

The above-described configuration makes it possible to eliminate the fluctuations of a wobble signal under data recording which are caused by a leak of a recording pulse by using only a space portion as the sampling period of the wobble signal under data recording and the recording-mark portion to which a high-power laser beam is applied due to the application of the recording pulse as a holding period. Thus, the S/N ratio of the wobble signal under data recording is improved and the jitter of a recording clock can be reduced. Thus, it is possible to improve the recording performance and the reliability thereof.

Moreover, by preparing the two types of binarizers for a land prepit with different binarization slicing levels for a mark portion and for a space portion, and by changing the two binarized signals in accordance with the change of a mark and space, it is possible to always binarize the land prepit at an optimum slicing level under data recording. Thus, it is possible to improve the read error rate of a land-prepit address under data recording, and the reliability of data recording is thereby improved.

Although not explained above in detail, a circuit for servo error may be fabricated as described in, for example, Japanese patent laid open Publication 7-320282/1995. A circuit for detecting prepit information may be fabricated as described in, for example, Japanese patent laid open Publication 10-3202828/1998. Further, a circuit for a wobble signal may be fabricated as described in, for example, Japanese patent laid open Publication 2000-113454. These publications are hereby incorporated by reference in the specification.

By using the configurations of the optical information recording apparatuses of the embodiments and the above-mentioned laser beam intensity detection method explained above, a sampling timing of the detection of a laser beam that is emitted to a recording medium or the detection of a laser beam that is reflected from a recording medium can be changed appropriately in accordance with the propagation delay time and the settling time of the system. Then, the sampling timing of a detection signal can always be kept properly even if there are various fluctuation factors such as circuit process, power supply voltage, and ambient temperature.

Further, it is possible to keep an optimum laser power in any case while data is being recorded in a recording medium such as an optical disk, and to stably reproduce a servo signal, address signal, and clock signal. Thus, the reliability of the apparatus is remarkably improved.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An apparatus comprising:
   a recording pulse generator operable to generate recording pulse signals so as to modulate an optical intensity of a laser light source according to recording data; and
   a sampling timing generator operable to generate a sampling timing to instruct sampling to a sampler;
   wherein information is recorded by emitting a laser beam that is modulated according to recording data to a recording medium;

said laser light source emits a laser beam to a recording medium;
a laser driver drives said laser light source according to the recording pulse signals generated by said recording pulse generator;
a photodetector detects the laser beam emitted by said laser light source; and
said sampler samples an output signal of said photodetector; and
wherein said sampling timing generator is operable to generate a sampling timing which is delayed by at least a response time of a propagation path including said laser driver, said laser light source and said photodetector.

2. An apparatus comprising:
a recording pulse generator operable to generate recording pulse signals so as to modulate an optical intensity of a laser light source according to recording data; and
a sampling timing generator operable to generate a sampling timing to instruct sampling to a sampler;
wherein information is recorded by emitting a laser beam that is modulated according to recording data to a recording medium;
said laser light source emits a laser beam to a recording medium;
a laser driver drives said laser light source according to the recording pulse signals generated by said recording pulse generator;
a photodetector detects the laser beam emitted by said laser light source and reflected by the recording medium;
said sampler samples an output signal of said photodetector; and
wherein said sampling timing generator is operable to generate a sampling timing which is delayed by at least a response time of a propagation path including said laser driver, said laser light source and said photodetector.

3. The apparatus according to claim 1, wherein said sampling timing generator is operable to generate a sampling timing for a record mark having a length which is longer than a sum of a setting time of a signal propagating the propagation path and a necessary acquisition time and a necessary aperture time of said sampler.

4. The apparatus according to claim 1, further comprising a laser power controller operable to control the power of said laser light source according to an output signal of said sampler.

5. The apparatus according to claim 1, further comprising a voltage monitor device operable to monitor a power supply voltage of at least one of said laser driver, said laser light source, said photodetector and said sampler,
wherein said sampling timing generator is operable to change a sampling timing according to the power supply voltage monitored by said voltage monitor device.

6. The apparatus according to claim 1, further comprising a temperature monitor device operable to monitor a temperature of at least one of said laser driver, said laser light source, said photodetector and said sampler,
wherein said sampling timing generator is operable to change a sampling timing according to the temperature monitored by said temperature monitor device.

7. The apparatus according to claim 1, further comprising a test pulse generator operable to output a test pulse signal to said laser driver, and a measurement unit operable to measure a response time of a test pulse signal until the test pulse signal propagates through the propagation path and is detected by said sampler as a sampled signal,
wherein said sampling timing generator is operable to determine a sampling timing according to the response time measured by said measurement unit.

8. The apparatus according to claim 2, wherein said sampling timing generator is operable to generate a sampling timing for a record mark having a length which is longer than a sum of a setting time of a signal propagation path and a necessary acquisition time and a necessary aperture time of said sampler.

9. The apparatus according to claim 2, wherein said sampling timing generator is operable to change a sampling timing according to a type of the recording medium.

10. The apparatus according to claim 2, further comprising a laser power controller operable to control a power of said laser light source according to an output signal of said sampler.

11. The apparatus according to claim 2, further comprising a servo error detector operable to provide a servo error signal by using an output signal of said sampler, and a servo device operable to converge the laser beam to a track in the recording medium by using the servo error signal provided by said servo error detector.

12. The apparatus according to claim 2, further comprising a recording clock reproducing device operable to reproduce recording clock signals by using an output signal of said sampler.

13. The apparatus according to claim 2, further comprising a voltage monitor device operable to monitor a power supply voltage of at least one of said laser driver, said laser light source, said photodetector and said sampler,
wherein said sampling timing generator is operable to change a sampling timing according to the power supply voltage monitored by said voltage monitor device.

14. The apparatus according to claim 2, further comprising a temperature monitor device operable to monitor a temperature of at least one of said laser driver, said laser light source, said photodetector and said sampler,
wherein said sampling timing generator is operable to change a sampling timing according to the temperature monitored by said temperature monitor device.

15. The apparatus according to claim 2, further comprising a test pulse generator operable to output a test pulse signal to said laser driver, and a measurement unit which measures a response time of a test pulse signal until the test pulse signal propagates through the propagation path and is detected by said sampler as a sampled signal,
wherein said sample timing generator is operable to determine a sampling time according to the response time measured by said measurement unit.

* * * * *